United States Patent
Copeland et al.

[11] Patent Number: 5,946,694
[45] Date of Patent: Aug. 31, 1999

[54] APPARATUS AND METHOD FOR TRANSPARENT APPLICATION OF SERVICE TO BUSINESS OBJECTS

[75] Inventors: George P. Copeland, Austin; Geoffrey M. Hambrick, Round Rock, both of Tex.; Eric N. Herness; Charles J. Redlin, both of Rochester, Minn.

[73] Assignee: International Business Machines Corporation, Armonk, N.Y.

[21] Appl. No.: 08/939,938

[22] Filed: Sep. 29, 1997

[51] Int. Cl.⁶ .................................................. G06F 17/30
[52] U.S. Cl. .............................. 707/103; 707/104; 705/7; 705/26
[58] Field of Search ................... 707/3, 9, 10, 100, 707/103, 104, 18; 395/182, 670, 500, 672, 683, 701, 712, 728, 800.23, 682; 705/36, 7, 26; 364/474.25; 379/201; 600/300; 345/349, 507; 380/4; 327/172

[56] References Cited

U.S. PATENT DOCUMENTS

| | | | |
|---|---|---|---|
| 5,233,513 | 8/1993 | Doyle | 705/7 |
| 5,406,477 | 4/1995 | Harhen | 395/670 |
| 5,446,903 | 8/1995 | Abraham | 380/4 |
| 5,724,575 | 3/1998 | Hoover | 707/10 |
| 5,732,270 | 3/1998 | Foody | 395/683 |
| 5,752,027 | 5/1998 | Familiar | 707/103 |
| 5,832,268 | 11/1998 | Anderson | 395/701 |
| 5,873,049 | 2/1999 | Bielak | 702/6 |
| 5,881,142 | 3/1999 | Frankel | 379/167 |

*Primary Examiner*—Thomas G. Black
*Assistant Examiner*—Diane D. Mizrahi
*Attorney, Agent, or Firm*—S. Jared Pitts

[57] ABSTRACT

According to a preferred embodiment of the present invention, a managed object assembly (MOA) is used to abstract the business logic of a given system from the system's operational aspects or infrastructure-specific characteristics. The managed object includes a data object, a business object, a managed object, and a mixin object. By isolating the functions of the business logic from the infrastructure of the system (including database structure), a significant amount of flexibility can be obtained and system re-engineering becomes noticeably simpler. Specifically, by isolating the business logic from the system resource details, changes in the business logic can be made in a manner that is independent of any detailed knowledge of the resources accessed by the system. In addition, as the underlying infrastructure requirements and data structures are changed, only the data object portion and the mixin object portion of the MOA needs to be changed or updated to provide access to the newly modified data structures. This can create significant savings in time and money as a system is updated to provide additional capabilities.

21 Claims, 3 Drawing Sheets

APPARATUS AND METHOD FOR TRANSPARENT APPLICATION OF SERVICE TO BUSINESS OBJECTS

BACKGROUND OF THE INVENTION

1. Technical Field

This invention generally relates to object-oriented programming and more specifically relates to an object-oriented model for re-engineering business data processing systems.

2. Background Art

The development of the EDVAC computer system of 1948 is often cited as the beginning of the computer era. Since that time, computer systems have evolved into extremely sophisticated devices, and computer systems may be found in many different settings. Computer systems typically include a combination of hardware (e.g., semiconductors, circuit boards, etc.) and software (e.g., computer programs). As advances in semiconductor processing and computer architecture push the performance of the computer hardware higher, more sophisticated computer software has evolved to take advantage of the higher performance of the hardware, resulting in computer systems today that are much more powerful than just a few years ago.

Computer systems typically include operating system software that controls the basic function of the computer, and one or more software application programs that run under the control of the operating system to perform desired tasks. For example, a typical IBM Personal Computer may run the OS/2 operating system, and under the control of the OS/2 operating system, a user may execute an application program, such as a word processor. As the capabilities of computer systems have increased, the application software programs designed for high performance computer systems have become extremely powerful. Additionally, software development costs have continued to rise because more powerful and complex programs take more time, and hence more money, to produce.

One way to improve the functionality of application software programs while reducing the associated development costs is to use object-oriented programming concepts. The goal of using object-oriented programming is to create small, reusable sections of program code known as "objects" that can be quickly and easily combined and re-used to create new programs. This is similar to the idea of using the same set of building blocks again and again to create many different structures. The modular and re-usable aspects of objects will typically speed development of new programs, thereby reducing the costs associated with the development cycle. In addition, by creating and re-using a group of well-tested objects, a more stable, uniform, and consistent approach to developing new computer programs can be achieved.

Typically, in the object-oriented model, object-oriented software programs or processes create and use specially designed objects to accomplish the required or desired goals of the application software. Most software processes will create an object or group of objects and then use those objects during the lifetime of that particular process. The objects that accomplish the software processes typically interact with other objects as part of the process. For example, a "client object" is an object that will request a certain service from another object, known as a "server object." The server object will receive the request from the client object and take appropriate steps to fill the client object's request.

In order to adopt an object-oriented model for a particular business environment, the business will generally use various object-oriented analysis techniques to abstract, design, and re-engineer their business data process system. Organizing business decisions and procedures according to the object model has several benefits. First, the business abstraction process produces conceptually understandable models with a flexible architecture that can more easily evolve with the changes experienced in many business environments. Secondly, organizing business functions according to the object model provides a certain amount of modularization that can provide new efficiencies by grouping similar or related business functions with one another. After completing this abstraction and analysis modeling process, the business can create and program a computer system that brings the business models to life, thereby enhancing productivity and increasing efficiency.

While the introduction and implementation of object-oriented programming models has been very beneficial in many cases, not all business organizations have been able to adopt object-oriented models and programming solutions. There are several obstacles to implementing object-oriented solutions in certain business environments. For example, even if the function of a given business can be successfully abstracted and approximated using the object-oriented model, many business organizations simply cannot afford to "start from scratch" and recreate the existing business functionality in a completely new object-oriented hardware/software environment. The existing nonobject-oriented computer system may have developed and evolved over a period of many years and the business will typically have a significant investment, both in time and money, in the system. These systems are often termed "legacy" systems and may include databases and other software applications that must continue to be used.

In addition, in many systems, the business logic portion of the system is closely and inextricably tied to the underlying database structures containing the business information. This means that whenever the underlying structure of the database or the data storage components are modified, the business logic portion must also be changed or the system may cease to function as intended.

What is needed, therefore, is a way to apply an object-oriented model to existing computer systems in various business environments without requiring extensive reworking of the business logic used to model the business or without changing the underlying data structures. Without providing a mechanism that adapts object models to existing business environments, many business will be forced to continue using out-dated solutions which are increasingly inefficient and undesirable.

DISCLOSURE OF INVENTION

According to a preferred embodiment of the present invention, an apparatus and a method provide object oriented solutions for legacy systems. Using the present invention, the business related functions of an abstracted business model are implemented in a category of objects termed "business objects." The functions of interacting with the infrastructure of the legacy system are implemented in a category of objects termed "data objects." The functions of setting up the execution environment for the business objects and the legacy system are implemented in a category of objects termed "mixin objects." The function of adapting a business object to a particular execution environment is implemented in a category of objects termed "managed objects." These various object implementations are combined to form a managed object assembly (MOA). The functional characteristics of an MOA are described below. The managed object portion of the MOA receives and directs method calls to the object components of the MOA. The managed object subclass inherits the business domain methods of a business object superclass and can use the business object class methods as appropriate to implement the desired functionality of an object-oriented business model. When business domain or business logic method calls are received, the managed object portion of the MOA will utilize the method calls inherited from the business object superclass to respond to the method calls. However, when infrastructure-related method calls are received, the managed object portion of the MOA will direct the methods calls to the mixin object. By abstracting the business domain logic from the infrastructure, changes to the underlying infrastructure do not affect the operation of the system. The mixin object and the data object can be modified to accommodate any underlying infrastructure changes as necessary while the business domain logic remains unchanged. The present invention, therefore, allows the business domain logic of a computer system to be developed independent of the system's database models and other infrastructure related issues.

BRIEF DESCRIPTION OF THE DRAWINGS

The preferred embodiments of the present invention will hereinafter be described in conjunction with the appended drawings, where like designations denote like elements, and.

BEST MODE FOR CARRYING OUT THE INVENTION

Figure 1:
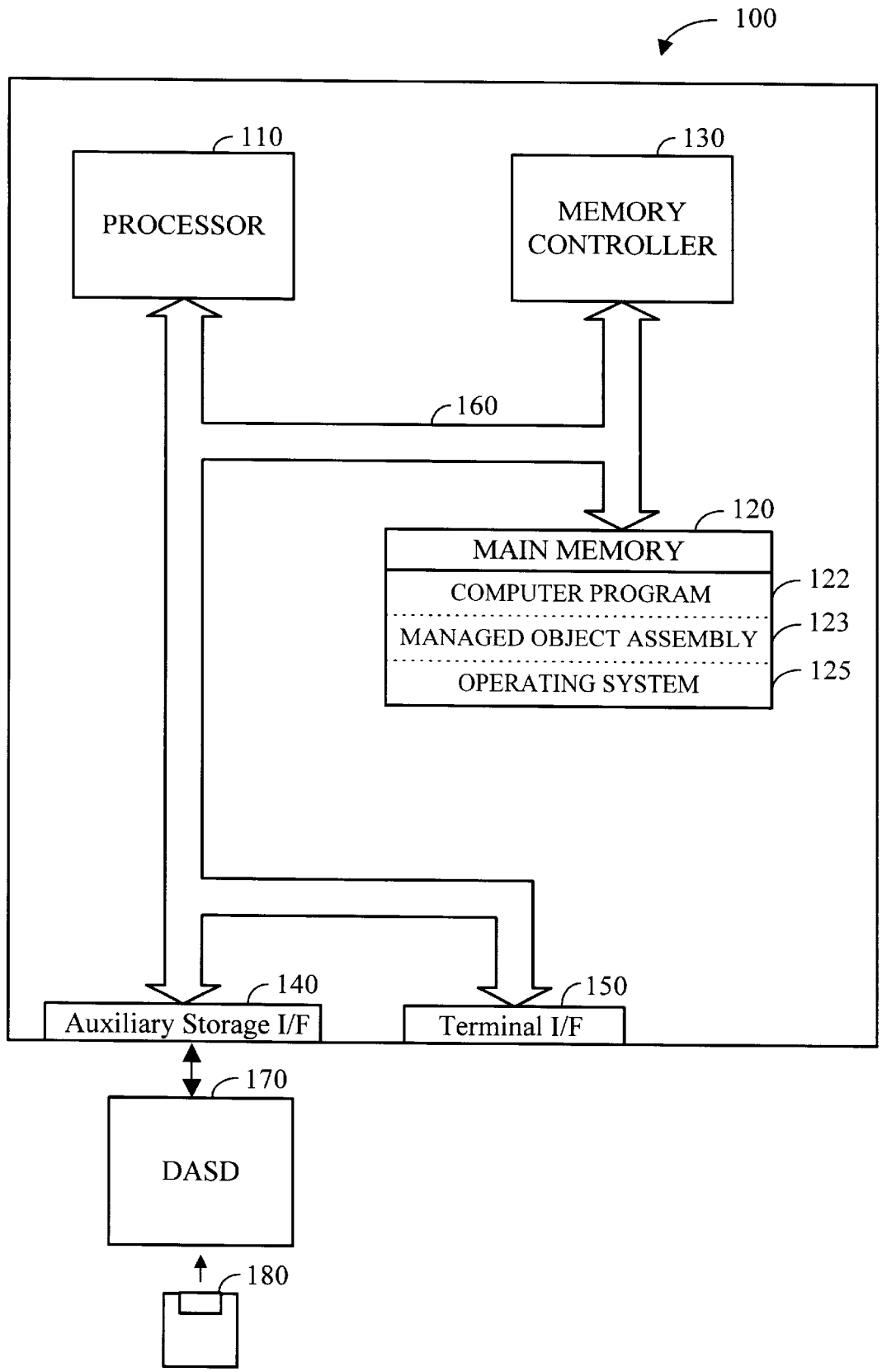
FIG. 1 is a block diagram of an apparatus according to a preferred embodiment of the present invention.

The present invention relates to object-oriented programming techniques. For those individuals who are not generally familiar with object-oriented programming, the Overview section below presents many of the concepts and terminology that will help to understand the invention. Individuals skilled in the art of object-oriented programming may wish to proceed directly to the Detailed Description section of this specification.

1. Overview

Object-oriented Technology v. Procedural Technology

Object-oriented programming is a method of program implementation in which programs are organized as cooperative collections of objects. Object-oriented programming differs from standard procedural programming in that it uses objects, not algorithms, as the fundamental building blocks for creating computer programs. This difference stems from the fact that the design focus of object-oriented programming technology is wholly different than that of procedural programming technology.

The focus of procedural-based design is on the overall process that solves the problem; whereas, the focus of object-oriented design is on how the problem can be broken down into a set of autonomous entities that can work together to provide a solution. The autonomous entities of object-oriented technology are, of course, objects. Said another way, object-oriented technology is significantly different from procedural technology because problems are broken down into sets of cooperating objects instead of into hierarchies of nested computer programs or procedures.

Thus, a pure object-oriented program is made up of code entities called objects. Each object is an identifiable, encapsulated piece of code and data that provides one or more services when requested by a client. Conceptually, an object has two parts, an external object interface and internal object data. In particular, all data is encapsulated by the object interface such that other objects must communicate with that object through its object interface. The only way to retrieve, process or otherwise access the encapsulated data is through the methods that define the object interface. This protects the internal data portion of the object from outside tampering. Additionally, because outside objects have no access to the internal implementation, that internal implementation can change without affecting other aspects of the program.

In this way, the object system isolates the requestor of services (client objects) from the providers of services (server objects) by a well defined encapsulating interface. In the classic object model, a client object sends request messages to server objects to perform any necessary or desired function. The message identifies a specific method to be performed by the server object, and also supplies any required parameters. The server object receives and interprets the message, and can then decide what service to perform.

Another central concept in object-oriented programming is the class. A class is a template or prototype that defines a type of object and outlines the makeup of the objects that belong to that class. Each object represents an instance of some class, and various classes are all members of a hierarchy of classes united via inheritance relationships. Each object in a given class inherits the characteristics of the parent class. By defining a class, objects can be created that belong to the class without having to rewrite the entire definition for each new object as it is created. This feature of object-oriented programming promotes the reusability of existing definitions and promotes efficient use of program code.

There are many computer languages that presently support object-oriented programming techniques. Smalltalk, Object Pascal, C++ and Java are all examples of programming languages that support object-oriented programming to one degree or another.

Definition of Terms

Certain terms will be explained below so that the use of these terms within this specification will be more clearly understood.

Infrastructure Domain. The infrastructure domain of a system includes the operational aspects of the system which are largely transparent to the user of the system. Examples of infrastructure domain items include services which implement concurrency, transaction support, data structure support, and security services, etc.

Business Domain. The business domain includes all of the operations and logic concerning the actual functionality of the system as it regards the actual business model being implemented by the system. For example, if the business model was a used car sales operation, the business domain logic would include all of the aspects of running the used car business. This would include buying and selling automobiles, checking and establishing credit for customers, etc. It is important to note that the business domain does not include support for infrastructure-related activities.

Business Object. The term business object refers to an object which belongs to a category of classes which embody the business domain logic of an application. This includes the business domain logic, methods, and expertise used to create the object oriented business model.

Managed Object. The term managed object refers to an object which belongs to a category of classes which tailor business objects to a particular execution environment. A managed object class is created as a subclass of the business object class. Each managed object includes a business object (BO) interface (i.e., the methods and attributes that client programs use) and a business logic implementation (i.e., code that implements the methods in the business object interface). Through the mechanism of inheritance, the objects belonging to the managed object class will respond to method calls in the same manner as objects belonging to the business object class. Each managed object is capable of directing various method calls to connect the business domain and the infrastructure domain by making appropriate calls to the mixin object. A managed object is able to coordinate the methods associated with the business domain logic and the methods associated with the infrastructure domain logic to allow the system to operate as intended.

Data Object. The data object is another component of the MOA. The data object contains some knowledge of the business domain aspects of the MOA and some knowledge of the infrastructure domain of the underlying system. The data object performs a mapping function between the abstract logic of the business domain and the physical data storage components of the system. The data object encapsulates information about the persistence characteristics of the MOA and may also store data values. One example of a data object is an object that contains Structured Query Language (SQL) statements for retrieving specific data from a database. Each data object implements an abstract interface for the business object attributes. Each implementation is specific to a given database product or legacy system (examples include dB2, CICS, IMS, and MQ).

Mixin Object. The mixin object is the part of the MOA which is automatically generated and initialized by the system when a new management object assembly is created. The mixin object typically includes the necessary logic to handle various system management activities that take place regarding the storage and security related aspects of the MOA. The mixin object will typically provide support for various system level services such as concurrency, persistence, transactions, etc. The mixin object is created with the ability to understand and work with the infrastructure domain of the system but has no knowledge of the operational functionality of the software application as represented by the business domain logic. It is important to note that the mixin object provides an interface to the infrastructure methods that will be used to store data and other infrastructure domain-related activities.

Managed Object Assembly. A Managed Object Assembly (MOA) is an object instance that is comprised of an instance of a data object, a mixin object, and a managed object.

2. Detailed Description

According to a preferred embodiment of the present invention, a managed object assembly is used to abstract the business logic of a given system from the operational system level specifics of the system. By isolating the functions of the business domain from the infrastructure domain of the system (including database structure), a tremendous amount of flexibility can be obtained and system re-engineering becomes noticeably simpler. Specifically, by isolating the business domain logic from the system resource details, changes in the business logic can be made in a manner that is independent of any detailed knowledge of the resources accessed by the system. In addition, as the underlying data structures are changed, only the data object portion of the MOA needs to be changed or updated to provide access to the newly modified data structures. This can create significant savings in time and money as a system is updated to provide additional capabilities.

In a preferred embodiment of the present invention, the business logic of a business organization is embodied in classes of objects collectively termed business objects. This business object is designed to implement the functions and contains a model of the application in the business domain. One example of modeling such a class of objects is an insurance policy. These insurance policy objects might have various implementations and methods for changing the beneficiary of the insurance policy, determining the insurance policy premium, maintaining a history of claims asserted against the policy, making a claim, altering the policy's coverage and liability limits, and other similar functions needed in the application to model the various services provided by an insurance company.

It is important to note that the business logic used to describe the business of the insurance company is not directly tied to the actual computer system operations and infrastructure related functions such as retrieving and storing data in a database or file system, providing transaction behavior, authenticating or authorizing users to specific business functions, determining the identity of objects, and identifying the sources of programming errors that cause system errors and exceptions. As the business objects described above interact with their internal state data to implement their associated business methods, there will be additional interactions with one or more data objects which are described in more detail below.

The system and infrastructure related functions necessary for the business objects to interact with the computer system are embodied in classes of objects collectively termed mixin objects. The mixin object contains a model of the various system functions and descriptions of how business objects interact with them. One specific example of a mixin object is a mixin object created specifically for a relational database. This relational database mixin object would provide the interface necessary to interact with the computer system and infrastructure related concerns.

For example, the mixin object provides the necessary interaction with the system-level security service to prevent the unauthorized invocation of a business method if the user was either not authenticated nor authorized to invoke a particular method. The relational database mixin object might also interact with the database to manage the connections to the database (open, close, suspend, resume, etc.) and also to manage the flow of data between the database and the object that requested the data from the database. This includes retrieving data from the database at the beginning of a transaction and storing the data at the end of the transaction. The mixin object may also control the memory paging of the object and can determine when the object is readily available in memory and when it is not. This allows system-level resources like memory, communication ports, processor cycles, database connections, etc. held by that object to be released when the object is not expected to perform any actions for some time.

The actual storing and retrieving of the data from the data base is provided in classes of objects collectively termed data objects. The data objects contain the logic needed to map between any data required to perform the business logic and the physical data which is stored in a secondary storage location or back end store, like a database, a file system or an application system. One example of a data object is an insurance policy data object that provides the necessary data for an insurance policy business object where the necessary data is stored in a relational database. This insurance policy data object may provide an interface or access to the relational database for create, retrieve, update, and delete (CRUD) operations. However, the interface and methods used by the business object to perform the various operations, such as setting and retrieving attributes, do not access the relational database directly, but rather caches the information for use in the CRUD methods which are performed by the data object.

The interface and methods necessary for combining the system/infrastructure logic and the business logic is provided in a class of object collectively termed managed objects. The managed objects contain a model of the interactions of the business logic and the system logic. These managed objects contain the logic needed to route method calls received on the managed object onto method calls on business objects or onto method calls for the mixin object. These object interactions may rely on multiple patterns for implementation. For example, system methods that are provided on the interface of the managed object may use a different pattern than the methods provided by the business objects. In addition, still other method calls may be needed to deal with specific interactions required by the programming language used to implement the components of the MOA.

One example of a managed object for the insurance policy scenario as described above is a managed object that uses data stored in a relational database, where the business object and the data object are both implemented in C++. In this example, the managed object delegates business methods to the business object and, infrastructure methods to the mixin object. Any C++ language specific requirements are handled by the managed object itself. In this example, the managed object uses three predetermined patterns for implementation of its methods. Each of these three patterns is described below.

The pattern used for implementing the business methods is for the managed object to call methods on the mixin object before and after calling the business method on the business object. This procedure allows the mixin object to perform the system-related functions necessary for every method request. It is important to note that this is necessary because the business methods do not include any system level or infrastructure related activities. These system related activities include things like performing security checks, locking records, etc. that need to be performed before the business object performs its method.

The pattern used for implementing the infrastructure methods, like those for determining object identity, is for the managed object to directly delegate the methods to the mixin object implementation.

The pattern used for supporting implementation language specific methods (i.e., those functions related directly to the specific programming language), like those used to provide pointer integrity, is to use helpers (like the mixin object and a base class that has methods defined for all managed objects). However, the implementation responsibility is not delegated and the managed object controls the flow. The combination of these four components (managed object, business object, mixin object, and data object) is a managed object assembly. In our insurance policy scenario example, the managed object inherits the business object implementation so they are a single object instance. The mixin object is a separate object instance and the data object is a third object instance. Taken together, these objects form the managed object assembly for the insurance policy. Any client of the managed object assembly would not have visibility to the individual components of the assembly but rather sees it as a single entity.

The introduction of a managed object assembly and treating it as a single entity affects the traditional life cycle model of objects. In the insurance policy example above, the C++ life cycle model used to create and eliminate the object is insufficient for creating and destroying the managed object assembly. This life cycle deficiency is remedied by using a factory to create the managed object assemblies and by implementing a new method (the "removes( )" method) on the object. Factories are used by clients to create objects while the removes( ) method is used to destroy them. Inside the factory, the components of the managed object assembly are created and joined. However, when the managed object assembly is returned to the client, only a single entity is returned. When the client wishes to destroy the object it uses the removes method. The remove( ) method is an infrastructure method that is delegated to the mixin object and the mixin object takes responsibility for destroying the various components of the managed object assembly.

Referring now to FIG. 1, a computer system 100 in accordance with a preferred embodiment of the present invention is an enhanced IBM AS/400 mid-range computer system. However, those skilled in the art will appreciate that the methods and apparatus of the present invention apply equally to any computer system, regardless of whether the computer system is a complicated multi-user computing apparatus or a single user device such as a personal computer or workstation. Computer system 100 suitably comprises a processor 110, main memory 120, a memory controller 130, an auxiliary storage interface 140, and a terminal interface 150, all of which are interconnected via a system bus 160. Note that various modifications, additions, or deletions may be made to computer system 100 illustrated in FIG. 1 within the scope of the present invention such as the addition of cache memory or other peripheral devices. FIG. 1 is presented to simply illustrate some of the salient features of computer system 100.

Processor 110 performs computation and control functions of computer system 100, and comprises a suitable central processing unit (CPU). Processor 110 may comprise a single integrated circuit, such as a microprocessor, or may comprise any suitable number of integrated circuit devices and/or circuit boards working in cooperation to accomplish the functions of a processor. Processor 110 suitably executes an object-oriented computer program 122 within main memory 120.

Auxiliary storage interface 140 allows computer system 100 to store and retrieve information from auxiliary storage devices, such as magnetic disk (e.g., hard disks or floppy diskettes) or optical storage devices (e.g., CD-ROM). One suitable storage device is a direct access storage device (DASD) 170. As shown in FIG. 1, DASD 170 may be a floppy disk drive which may read programs and data from a floppy disk 180. It is important to note that while the present invention has been (and will continue to be) described in the context of a fully functional computer system, those skilled in the art will appreciate that the mechanisms of the present invention are capable of being distributed as a program product in a variety of forms, and that the present invention applies equally regardless of the particular type of signal bearing media to actually carry out the distribution. Examples of signal bearing media include: recordable type media such as floppy disks (e.g., disk 180) and CD ROMS, and transmission type media such as digital and analog communication links, including wireless communication links.

Memory controller 130, through use of a processor (not shown) separate from processor 110, is responsible for moving requested information from main memory 120 and/or through auxiliary storage interface 140 to processor 110. While for the purposes of explanation, memory controller 130 is shown as a separate entity, those skilled in the art understand that, in practice, portions of the function provided by memory controller 130 may actually reside in the circuitry associated with processor 110, main memory 120, and/or auxiliary storage interface 140.

Terminal interface 150 allows system administrators and computer programmers to communicate with computer system 100, normally through programmable workstations. Although the system 100 depicted in FIG. 1 contains only a single main processor 110 and a single system bus 160, it should be understood that the present invention applies equally to computer systems having multiple processors and multiple system buses. Similarly, although the system bus 160 of the preferred embodiment is a typical hardwired, multidrop bus, any connection means that supports bidirectional communication in a computer-related environment could be used.

Main memory 120 suitably contains one or more computer programs 122, one or more managed object assemblies (MOAs) 123, and an operating system 125. Computer program 122 in memory 120 is used in its broadest sense, and includes any and all forms of computer programs, including source code, intermediate code, machine code, and any other representation of a computer program. Each MOA 123 is created and/or manipulated by some portion of computer program 122 or another MOA 123. The term "memory" as used herein refers to any storage location in the virtual memory space of system 100. It should be understood that main memory 120 will not necessarily contain all parts of all mechanisms shown. For example, portions of computer program 122 and operating system 125 may be loaded into an instruction cache (not shown) for processor 110 to execute, while other files may well be stored on magnetic or optical disk storage devices (not shown). In addition, although computer program 122 is shown to reside in the same memory location as operating system 125 and MOA 123, it is to be understood that main memory 120 may consist of disparate memory locations.

Figure 2:
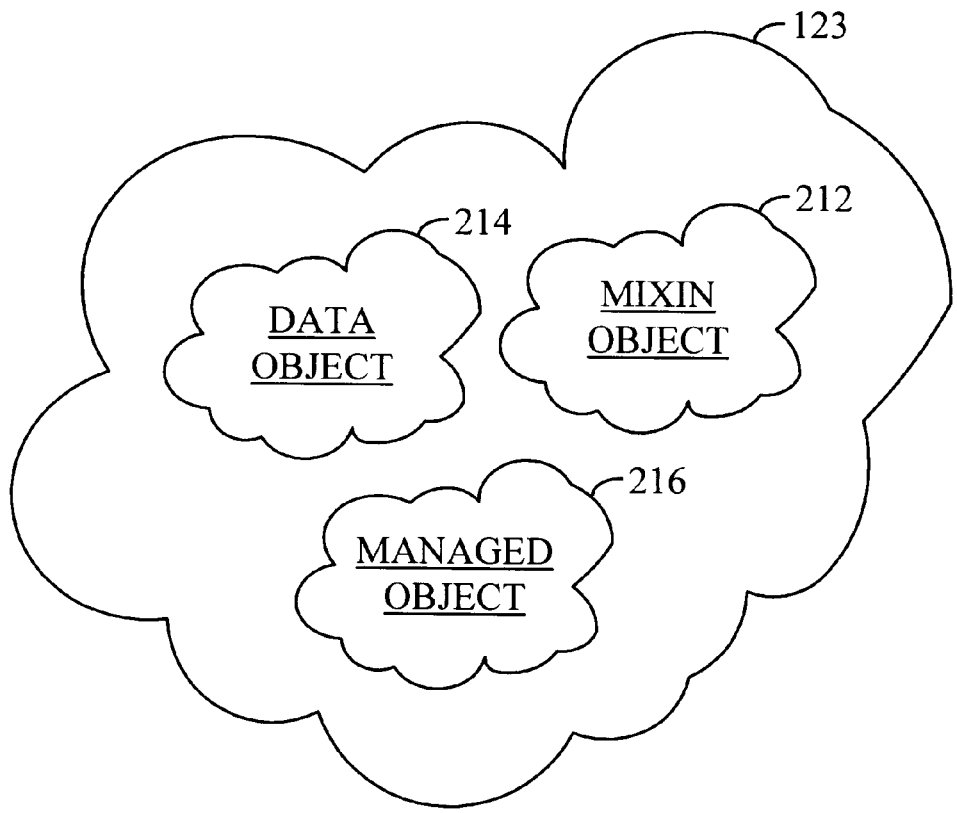
FIG. 2 is an object diagram of a managed object assembly according to a preferred embodiment of the present invention.

Referring now to FIGS. 1 and 2, a managed object assembly (MOA) 123 according to a preferred embodiment of the present invention includes: a mixin object 212; a data object 214; and a managed object 216. Mixin object 212 is the part of managed object assembly 123 which includes the object attributes necessary for system management functions. Mixin object 212 includes the capabilities necessary to handle infrastructure-related method calls that are called on MOA 123.

Data object 214 is one component of MOA 123. Data object 214 encapsulates information about the persistence characteristics of MOA 123 and may also store data values. One example of data object 214 is an object that contains Structured Query Language (SQL) statements for retrieving specific data from a database. Managed object 216 is also a component of MOA 123.

Managed object 216 contains logic related to the business logic-related functional aspects of MOA 123. For example, a managed object 216 for an insurance policy system may have a method that computes the expiration date of the insurance policy. In addition, managed object 216 contains the logic necessary to route method calls made on MOA 123 to mixin object 212 and the business logic within managed object 216. The business logic portion of managed object 216 is inherited from a business object superclass. The interaction of these various objects will be described in greater detail below.

Figure 3:
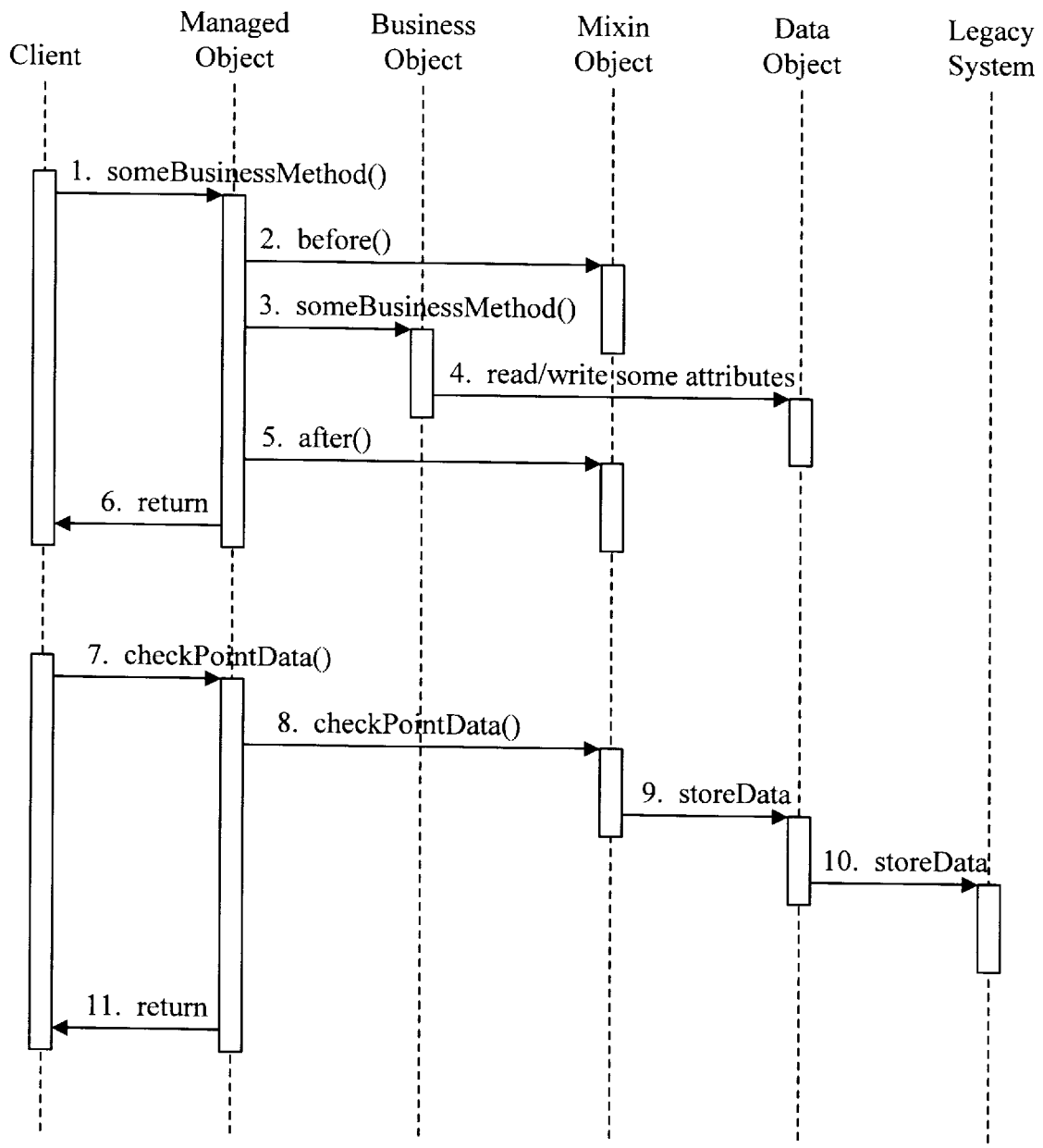
FIG. 3 is a object interaction diagram for objects according to a preferred embodiment of the present invention.

Referring now to FIGS. 1, 2, and 3, the interaction of the various objects according to a predetermined pattern can be illustrated. There are typically at least two predetermined patterns developed for each managed object 216, a business domain pattern and an infrastructure domain pattern. As shown in FIG. 3, a client can call a method on MOA 123 which involves only the business domain logic (steps 1–6) that would be handled according to the predetermined business domain pattern. Alternatively, a client can call a method on MOA 123 which is related to the infrastructure domain (steps 7–11) that would be handled by managed object 216 of MOA 123 according to the predetermined infrastructure domain pattern. Each of these patterns includes the logic to handle any method calls which are related to the business domain or the infrastructure domain. Additionally, there may be some programming language patterns developed which are put in place to deal with any implementation programming language constraints that are inherent in many programming languages. An example of a programming pattern would be the pattern developed to work with pointers in the C++ language.

When a client calls someBusinessMethod( ) on MOA 123 (step 1), managed object 216 receives the method call and recognizes that the method involves the business domain of system 100 according to the predetermined pattern for business domain logic. SomeBusinessMethod( ) is merely representative of the many different types of methods which could be implemented in system 100 to represent the abstracted object-oriented business model of a given business environment. After receiving the someBusinessMethod( ) call, managed object 216 calls a before( ) method on mixin object 212 (step 2) so that any required infrastructure methods may be completed prior to performing the someBusinessMethod( ) call. These infrastructure related calls might include locking a data record in order to preserve data integrity while the record is accessed by someBusinessMethod( ). Then, managed object 216 calls someBusinessMethod( ) on the business logic portion of managed object 216 (step 3). It is important to note that, as explained above, managed object 216 has inherited certain business logic methods from a business object superclass. In this example, someBusinessMethod( ) requires the business domain logic portion of managed object 216 to read or write various attributes to data object 214 (step 4). Managed object 216 then calls an after( ) method on mixin object 212 (step 5). Similar to the before( ) method above, the after( ) method takes care of any infrastructure related details that must be performed after the completion of someBusinessMethod( ), such as releasing the record lock that was used during someBusinessMethod( ). Finally, after the infrastructure logic has been completed, the managed object returns to the client to acknowledge completion of the task (step 6).

Alternatively, the client may call the checkPointData( ) method on MOA 123 (step 7). In that case, managed object 216 receives the method call and recognizes that the method involves the infrastructure domain of system 100 according to the predetermined pattern for infrastructure domain logic of system 100. The checkPointData( ) method call is a method call to store information in a database and is merely representative of the many different types of methods which could be called and implemented in system 100 to represent the infrastructure-related activities of a given system environment. After receiving the checkPointData( ) method call, managed object 216 calls the checkPointData( ) method on mixin object 212 (step 8). Mixin object 212, in turn, calls the storeData( ) method on data object 214 (step 9) and the data is stored in the database of the legacy system (step 10). Finally, after the data has been stored, the managed object returns to the client to acknowledge completion of the task (step 11). It is important to note that the client needs no knowledge of the structure of the database storage requirements of the legacy system. In addition, the business logic is not directly affected by any changes in the database storage requirements of the legacy system. This means that mixin object 212 and data object 214 can be changed and updated to accommodate alternative infrastructure requirements and the business domain logic can remain unchanged.

The embodiments and examples set forth herein were presented in order to best explain the present invention and its practical application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the forthcoming claims.

We claim:

1. An apparatus, the apparatus comprising:
    a CPU coupled to a bus;
    a memory coupled to the bus;
    a managed object assembly residing in the memory; and
    wherein the managed object assembly receives a method and processes the method by abstracting business logic functions from infrastructure functions according to a plurality of predetermined patterns.

2. The apparatus of claim 1, wherein managed object assembly comprises:
    a data object;
    a business object, the business object embodying a business domain logic;
    a mixin object, the mixin object providing an interface to an infrastructure domain; and
    a managed object, the managed object performing business logic functions by calling a method on the business object and performing infrastructure functions by calling a method on the mixin object.

3. The apparatus of claim 1, wherein at least one of the plurality of predetermined patterns is a business domain pattern.

4. The apparatus of claim 1, wherein at least one of the plurality of predetermined patterns is an infrastructure domain pattern.

5. The apparatus of claim 2, wherein the data object provides an interface to a data storage location.

6. The apparatus of claim 2, wherein the managed object assembly routes a business domain related method to the business object.

7. The apparatus of claim 2, wherein the managed object assembly routes an infrastructure related method to the mixin object.

8. An apparatus, the apparatus comprising:
    a CPU coupled to a bus;
    a memory coupled to the bus;
    a managed object assembly residing in the memory, the managed object assembly comprising a data object, a managed object, a business object embodying a business domain logic, and a mixin object providing an interface to an infrastructure domain; and
    wherein the managed object receives a plurality of method calls and routes infrastructure functions from the plurality of method calls to the mixin object and business logic functions from the plurality of method calls to the business object.

9. The apparatus of claim 8, wherein the data object provides an interface to a data storage location and wherein the data object stores and retrieves data in the data storage location.

10. The apparatus of claim 8, wherein the managed object assembly abstracts the business domain logic from the infrastructure domain allowing changes in the infrastructure domain to be accommodated by changing the mixin object and the data object, without requiring changes be made to the business object implementing the business domain logic.

11. The apparatus of claim 8, wherein the managed object calls the mixin object to perform infrastructure functions before and after the managed object calls the business object to perform domain logic functions.

12. An apparatus, the apparatus comprising:
    a CPU coupled to a bus;
    a memory coupled to the bus;
    a managed object assembly residing in the memory, the managed object assembly comprising a data object, a managed object, a business object, and a mixin object;
    wherein the managed object receives a business domain method call and calls a first infrastructure domain method on the mixin object to perform system related functions to prepare for business related functions;
    wherein the managed object calls a first business logic method on the business object to perform the business related functions; and
    wherein the managed object calls a second infrastructure domain method on the mixin object to perform system related functions necessary to complete the business related functions.

13. A computer implemented method of routing method calls in an object-oriented environment, the method comprising the steps of:
    providing a managed object assembly residing in a memory location, the managed object assembly comprising a data object, a business object, a managed object, and a mixin object;
    calling a first method on the managed object assembly;
    the managed object assembly routing the first method call to an infrastructure domain via the mixin object based on a first predetermined pattern;
    calling a second method on the managed object assembly; and
    the managed object assembly routing the second method call to the business object based on a second predetermined pattern.

14. A program product for routing method calls in an object-oriented environment, the program product comprising:
    a managed object assembly, the managed object assembly comprising a data object, a business object embodying a business domain logic, a managed object, and a mixin object providing an interface to an infrastructure domain; wherein the managed object receives a plurality of method calls and routes business logic functions from the plurality of method calls to the business object and routes infrastructure domain functions from the plurality of method calls to the mixin object; and signal bearing media bearing the managed object assembly.

15. The program product of claim 14, wherein the data object provides an interface to a data storage location.

16. The program product of claim apparatus of claim 8, wherein the managed object calls the mixin object to perform infrastructure functions before and after the managed object calls the business object to perform domain logic functions.

17. The program product of claim 14, wherein the managed object assembly abstracts the business domain logic from the infrastructure domain allowing changes in the infrastructure domain to be accommodated by changing the mixin object and the data object, without requiring changes be made to the business object implementing the business domain logic.

18. The program product of claim 14 wherein the signal bearing media comprises recordable media.

19. The program product of claim 14 wherein the signal bearing media comprises transmission media.

20. A computer-implemented method for routing method calls in an object oriented environment, the method comprising the steps of:

providing at least one Central Processing Unit (CPU);

providing a memory coupled to the at least one CPU;

providing a managed object assembly residing in the memory, the managed object assembly including a business object embodying business domain logic and a mixin object providing an interface to an infrastructure domain;

providing a software application residing in the memory and being executed by the at least one CPU;

the software application calling a method on the managed object assembly; and the managed object assembly routing the method to another object routes business domain functions from the method to the business object and routes infrastructure functions from the method to the mixin object.

21. The computer-implemented method of claim 20, wherein the step of providing a managed object assembly residing in the memory further comprises:

providing a data object residing in the memory; and providing a managed object residing in the memory.

* * * * *